United States Patent [19]

Hongu

[11] Patent Number: 4,952,533
[45] Date of Patent: Aug. 28, 1990

[54] SILICON CARBIDE CERAMIC BONDING COMPOSITIONS

[75] Inventor: Tatsuhiko Hongu, Yokohama, Japan

[73] Assignee: Shin-Etsu Chemical Co., Ltd., Tokyo, Japan

[21] Appl. No.: 474,321

[22] Filed: Feb. 2, 1990

Related U.S. Application Data

[63] Continuation-in-part of Ser. No. 393,778, Aug. 15, 1989, abandoned.

[30] Foreign Application Priority Data

Aug. 15, 1988 [JP] Japan .................. 63-202827

[51] Int. Cl.$^5$ .............................. C04B 35/56
[52] U.S. Cl. ......................... 501/90; 501/88
[58] Field of Search ............. 501/90, 88; 51/298; 523/138, 139, 140, 144, 145, 148; 524/443

[56] References Cited

U.S. PATENT DOCUMENTS

| | | | |
|---|---|---|---|
| 4,525,461 | 6/1985 | Boecker et al. | 501/90 |
| 4,526,649 | 7/1985 | Gupta et al. | 156/629 |
| 4,692,418 | 9/1987 | Boecker et al. | 501/90 |
| 4,701,426 | 10/1987 | Okuno et al. | 501/90 |

FOREIGN PATENT DOCUMENTS

| | | | |
|---|---|---|---|
| 947056 | 8/1956 | Fed. Rep. of Germany . | |
| 3311553 | 10/1984 | Fed. Rep. of Germany . | |
| 56-1236651A | 11/1985 | Japan | 501/90 |
| 56-2041762A | 12/1985 | Japan | 501/90 |
| 2137975 | 10/1984 | United Kingdom . | |

*Primary Examiner*—Mark L. Bell
*Assistant Examiner*—Deborah Jones
*Attorney, Agent, or Firm*—Birch, Stewart, Kolasch & Birch

[57] ABSTRACT

A bonding composition for silicon carbide ceramics, comprising: silicon carbide powder having a particle size of 1 to 50 μm, powder carbon having a particle size of up to 15 μm, silicon powder having a particle size of up to 10 μm, a thermosetting resin, and a catalytically curable resin and a curing agent therefor. The composition is effective in bonding sintered silicon carbide ceramic pieces.

7 Claims, No Drawings

SILICON CARBIDE CERAMIC BONDING COMPOSITIONS

CROSS REFERENCE TO RELATED APPLICATION

This application is a continuation-in-part of application Ser. No. 393,778, filed on 8/15/89, now abandoned.

FIELD OF THE INVENTION

This invention relates to compositions for bonding silicon carbide ceramics.

BACKGROUND OF THE INVENTION

In recent years, silicon carbide (SiC) ceramics have been used in a variety of industrial fields including semiconductors, automobiles, chemical plants, and machine tools, due to their heat resistance, oxidation resistance, abrasion resistance, hardness, and other excellent properties. In order that silicon carbide find further widespread commercial applications, not only its manufacture, but also the bonding of silicon carbide ceramics pieces to each other or to metal pieces are thought key. A simple economical bonding technique is desired particularly from the industrial standpoint.

The prior art well-known ceramics bonding methods typically include (1) mechanical bonding, (2) brazing or metallizing, (3) solid phase or fusion bonding using metal foils or bands, and (4) bonding utilizing chemical reactions. The first three of these bonding methods are not regarded as simple or inexpensive, because mechanical bonding (1) requires a high precision of operation, and metallizing (2) and solid phase or fusion bonding (3) require special equipment.

Bonding method (4), which utilizes chemical reactions, is most simple. Bonding of silicon carbide utilizing a chemical reaction, more particularly, bonding of reactively sintered silicon carbide is reported by Izeki et al, Yougyou Kyoukai Si) Journal of Japanese Ceramic Society), Vol. 91, 259-264 (1983) Izeki's bonding method involves: applying a bonding composition of silicon carbide powder, carbon powder, and a binder (a mixture of phenol resin and furan resin in a solvent) to a surface of a first ceramic piece to be bonded; joining the first piece to a second piece; pressing the assembly under pressure; and introducing silicon to the bonding interface in vacuum at 1450° C., to give bonding.

This method, however, has a problem in that expansion occurs due to a reaction between the introduced silicon and the carbon in the bonding composition, so that silicon is further introduced into the voids created by the expansion, to form a layer consisting solely of silicon, which layer may become a cause of breakage. To avoid the above expansion, pieces to be bonded together need to be held in close contact during heat bonding. The holding of pieces together in intimate contact under such elevated temperatures requires an advanced level of technology, and often imposes limitations on the manufacturers of bonding equipment. This often invites a situation where only the manufacturer of ceramic pieces can carry out the bonding of ceramic pieces.

A further difficulty arises in bonding of complex shaped pieces. In order to produce an article of complex configuration by reactive sintering, it has generally been adopted to bond pieces, while they are in a calcined state, with a bonding agent having the same composition as the calcined pieces before reactive sintering is carried out. This method has disadvantages in that resulting bond strength is low and such bonding can only be practiced by ceramics manufacturers.

SUMMARY OF THE INVENTION

Therefore, an object of the present invention is to provide a novel and improved bonding composition adapted for bonding of silicon carbide ceramics through chemical reaction, which accomplishes a high bond strength, which is devoid of expansion at the bonding interface due to the reaction, which needs no special tool (like press holding jigs), which is applicable to ordinary (that is, commercially available) sintered bodies of silicon carbide ceramics instead of calcined bodies, and which enables simple and economical bonding.

According to the present invention, there is provided a bonding composition for silicon carbide ceramics, comprising:

silicon carbide powder having an average particle size of 1 to 50 μm, carbon powder having an average particle size of up to 15 μm;

silicon powder having an average particle size of up to    μm;

a thermosetting resin;

a catalytically curable resin; and a curing agent for the catalytically curable resin;

wherein 0.4 to 2.2 parts by weight of said silicon carbide powder and 1.9 to 4.2 parts by weight of said silicon powder are blended per part by weight of the total carbon in said carbon powder plus carbon present resulting from thermal decomposition of said thermosetting resin, said catalytically curable resin, and said curing agent.

More detailedly, apart from the concept of external introduction of silicon as proposed by Izeki's method, the present inventors have found that commercially available sintered ceramic pieces can be firmly bonded to an increased bond strength while controlling formation of a silicon layer which would lower the bond strength of the bonding interface, when silicon powder having an average particle size of up to 10 μm is contained in advance in a bonding composition comprising silicon carbide powder having an average particle size of 1 to 50 μm and carbon powder having an average particle size of up to 15 μm in the specific amounts per the weight of the total carbon value, an a thermosetting resin, a catalytically curable resin and a curing agent for the catalytically curable resin are further added to the bonding composition.

The bonding mechanism of Izeki's method is based on external introduction of Si to the bonding interface consisting of a powder mixture of SiC and C. Introduction of Si causes the chemical reaction: Si+C→SiC to take place to form a bond. As previously pointed out, this reaction is accompanied by a volume increase or expansion to create voids into which Si further penetrates, eventually forming a layer consisting solely of silicon. The silicon layer expands again upon cooling, causing splitting of the once bonded assembly into respective parts. Rather than the external introduction of silicon, the present inventors propose a bonding method using the above-described bonding composition having a controlled amount and size of silicon powder previously included therein. This is based on the finding that the expansion in volume due to the chemical reaction: Si+C→SiC can be fully accommodated and the controlled amount of co-present silicon avoids formation of a silicon layer.

The bonding composition may be applied to commercially available silicon carbide ceramic sintered parts at room temperature and only requires simple heating (e.g./ by the use of a propane burner) for bonding such ceramic sintered parts into an assembly having an increased bond strength between bonded parts, without the need for holding together the ceramic parts under pressure during the bonding process.

DETAILED DESCRIPTION OF THE INVENTION

The present invention provides a bonding composition for silicon carbide ceramics, comprising silicon carbide powder, carbon powder, silicon powder, a thermosetting resin, a catalytically curable resin, and a curing agent for the catalytically curable resin. The bonding composition preferably takes on a two part form, that is, a first part or pack composed of silicon carbide powder, carbon powder, silicon powder, a thermosetting resin, and a catalytically curable resin, and a second part or pack composed of a curing agent for the catalytically curable resin in the first pack, the two packs being mixed upon use.

The silicon carbide powder (SiC), a component of the first pack from which the bonding composition of the invention is constructed may be either alpha-SiC or beta-SiC. For economic reasons, the preferred silicon carbide is commercially available finely divided alpha-SiC (obtained by the Acheson method). The average particle size of SiC should be in the range of from 1 to 50 $\mu$m, preferably in the range of from 3 to 35 $\mu$m although the exact size depends on the particle size of the remaining components of the composition. SiC particles with a size of less than 1 $\mu$m are too small to accommodate an expansion in volume due to the reaction between Si and C, thus allowing for cracks to develop during heating. SiC particle sizes of more than 50 $\mu$m result in too thick of a bonding layer, which can also crack during heating.

The carbon powder (C) is an important component in the bonding composition of the invention. The carbon powder should preferably be as fine as possible or have a large specific surface area in order that it evenly react with the silicon powder (Si), to form homogeneous silicon carbide layer (SiC). Finer particles are unlikely to create voids or interstices due to expansion at the bonding interface upon reaction, thereby inducing no additional stresses and thus giving a higher bond strength. For this reason, the carbon powder can have an average particle size of up to 15 $\mu$m, but preferably only up to 10 $\mu$m. Its specific surface area (BET method) is preferably at least 70 m$^2$/g, preferably at least 100 m$^2$/g. Coarse carbon particles of more than 15 $\mu$m in diameter cause cracks during heating. Also, when using particles with a smaller specific surface area, sometimes the reaction does not proceed evenly, which can lower bond strength. The lower limit of the average particle size is preferably 0.5 $\mu$m and the upper limit of the specific surface area is preferably 500 m$^2$/g.

The silicon powder (Si) which reacts with the above-described carbon powder should also preferably be as fine as possible, just as with the carbon powder. The silicon powder can have an average particle size of up to 10 $\mu$m, but preferably only up to 7 $\mu$m. Silicon particles with a size of more than 10 $\mu$m can cause localized reaction and crack formations during heating, which lower bond strength. The lower limit of the average particle size is preferably 0.1 $\mu$m.

A fourth component in the bonding compositions of the present invention is the thermosetting resin, which is not particularly limited, except insofar as it can attach together the ceramic pieces to be bonded, until the temperature at which silicon reacts with carbon is reached. Examples of suitable thermosetting resins include phenol resins, silicone varnishes, melamine resins, phenol-melamine resins and alkyd resins.

The catalytically curable resin, a fifth component of the bonding compositions of the invention, is added for the purpose of curing, in the presence of a catalyst, to join the ceramic pieces together into an assembly which can be handled at room temperature. Any desired catalytically curable resins may be used for the purpose. Preferably however, those resins which are used can cure in the presence of a catalyst at room temperature. For example, furan resins, epoxy resins, unsaturated polyester resins, and urea resins may be used in the present invention.

The foregoing first to fifth components, silicon carbide powder, carbon powder, silicon powder, thermosetting resin, and catalytically curable resin may be combined together to form the first pack or part of the compositions of the present invention. The first pack may also contain any desired additional components such as polyisocyanate and polyol binders, N-methyl pyrrolidone, and formamide.

It is desirable to add a solvent to the foregoing components to form a paste which is readily applicable to a surface of a ceramic piece to be bonded. The solvent may be added before application or previously included in the primary (first) pack or part. The solvent may be a volatile solvent having a boiling point of 0° C. to 200° C. such as acetone, chloroform, dimethyl ether, benzene, methyl ethyl ketone, ethanol, acetonitrile, isopropanol, butanol, methylene chloride, trichloroethane, perchloroethylene, toluene, xylene and the like. However those solvents having a boiling point of 50° C. to 200° C. are preferred for their non-volatility during shelf storage. Examples of such solvents include dimethyl sulfoxide, dimethylformamide, furfuryl alcohol, cyclohexanol, dimethylacetoamide, N-methyl pyrrolidone, and mixtures thereof.

The bonding composition of the invention further includes a curing agent or catalyst for curing the catalytically curable resin in the first pack. The curing agent may preferably constitutes the second pack which is separate from the first pack and is mixed with the first pack upon use. The identity of the curing agent depends on the type of catalytically curable resin used. Those curing agents which are considered useful are commonly used in condensation reaction, for example, sulfonate ammonium salts, amine salts, sulfonium chorides, amide inorganic acid salts, sulfamic acid, and trichloroacetic acid. More specifically, n-butylamine, triethanol amine, ethylenediamine, diethylaminopropylamine, diaminodiphenyl sulfone, piperidine, aminoethylpiperidine, dicyandiamide, phthalic anhydride, hexahydrophthalic anhydride, guanidine, trichloroacetic acid, p-toluenesulfonic acid, 2-aminosulfonic acid, aminometasulfonic acid, magnesium carbonate, magnesium chloride, sodium hydroxide, potassium hydroxide and the like are preferred. Since sets of catalytically curable resins and curing agents are commercially available, the resins and the curing agents are advantageously selected therefrom. As a matter of course, the catalyst also causes partial condensation of the thermosetting resin, thereby contributing to an improvement in room temperature bonding strength. The second pack or part composed of the curing agent may further contain the same solvent as added to the first pack, It is thought rather preferred to dilute the curing agent with the solvent.

The components of the bonding composition disclosed herein are combined in such amounts and proportions as to form a joint having an approximately equal density to the ceramic pieces to be bonded therewith. More specifically, the carbon powder is blended in an amount of 5 to 30 % by weight based on the total weight of the silicon carbide powder, carbon powder and silicon powder. The silicon carbide powder is 0.4 to 2.2 parts by weight, preferably 0.6 to 2 parts by weight and the silicon powder is 1.9 to 4.2 parts by weight, preferably 2 to 4 parts by weight, per part by weight of the total carbon given by the carbon powder plus the carbon present resulting from thermal decomposition of the thermosetting resin, the catalytically curable resin and the curing agent.

Less than 0.4 parts of silicon carbide per part by weight of carbon is insufficient to accommodate the expansion in volume due to the reaction between C and Si, thereby causing cracks during heating. Furthermore, compositions containing more than 2.2 parts of silicon carbide per part by weight of carbon can lose bond strength because of pore formation. Cracks can occur during heating with less than 1.9 parts of silicon per part by weight of carbon, and pore formation, which detracts from bond strength, can occur with more than 4.2 parts of silicon per part by weight of carbon.

It should be noted that the amount of carbon referred to herein is calculated as including any carbon present in addition to the carbon powder, that is, when the thermosetting resin, catalytically curable resin, and curing agent thermally decomposed to leave C at the bonding interface. The carbon formed by decomposition of such components is generally amorphous and moderately reactive with silicon, thus also contributing to the control of expansion due to reaction at the bonding interface. The total carbon is usually present in the resulting bonding layer in an amount of 10 to 50% by weight the bonding layer.

The catalytically curable resin is preferably blended in an amount of 5 to 20%, especially 7 to 18% by weight based on the total weight of the silicon carbide powder, carbon powder, and silicon powder components. Less than 5% by weight of the catalytically curable resin sometimes fails to achieve a sufficient bonding strength to withstand handling at room temperature. More than 20% by weight of the catalytically curable resin will increase the thickness of the bonding layer or the spacing between the bonding surfaces, thereby losing bond strength.

The thermosetting resin is preferably blended in amounts of about one-half to one-third of the weight of the catalytically curable resin. Lesser proportions of the thermosetting resin will sometimes fail to maintain the bonding surfaces in close contact during heating. Excess proportions of the thermosetting resin mean relatively short proportions of the catalytically curable resin, which might fail to achieve a sufficient bonding strength during the initial bonding of ceramic pieces.

The amount of the solvent added to the first pack to form a paste is an amount necessary to maintain the paste. The amount of solvent generally used ranges from an equivalent amount to the thermosetting resin to one-half thereof.

The amount of the curing agent used varies with its type relative to the catalytically.

The amount of the curing agent used varies with its type relative to the catalytically curable resin, but generally ranges from 1 to 20% by weight of the amount of the catalytically curable resin.

The method of bonding silicon carbide ceramic pieces with the bonding composition of the invention is not particularly limited. In general, a mixture of silicon carbide powder, carbon powder, silicon powder, thermosetting resin and catalytically curable resin is tumbled with a solvent such as furfuryl alcohol in a ball mill or with any other mixing means until a paste is formed. The order of adding these components to the mill is not critical. The paste is combined with the curing agent in the diluent solvent just before use. The resulting composition is applied to a surface of a ceramic piece to be bonded, which is mated to another ceramic piece under pressure to form an assembly where the catalytically curable resin cures, resulting in the assembly which can be handled at room temperature, because of the bond between the mating surfaces. The assembly is then heated at a temperature of about 100 to 400° C. for example about 150° C., to drive off the solvent and set the thermosetting resin. Then the temperature is gradually increased to carbonize the resins. The assembly is then finally heated to a temperature of 1,400° C. or higher, preferably 1,450° to 1,600° C. to achieve reaction between Si and C. The atmosphere under which the assembly is heated to temperatures of 1,400° C. or higher is preferably vacuum or inert gas although heating in air is permissible. Heating may be carried out by means of a propane burner if desired. The heating time varies with the configuration of the joined pieces.

The bonding composition of the invention may advantageously be used in bonding between pieces of silicon carbide ceramic material formed by reactive sintering, recrystallization, atmospheric sintering or the like or between such ceramic pieces and pieces of metal or any other materials.

As described above, the bonding composition of the invention can bond together silicon carbide ceramic pieces typically found in a commercially available final form, rather than in a calcined form only available intermediatly during the manufacturing process. Further, a firm bond can be accomplished by relatively simple heating as by the use of a propane burner if desired. With the use of the present composition, such silicon carbide ceramic pieces can be bonded without a need for any specially designed expensive equipment such as clamping equipment which can withstand high temperatures, vacuum equipment, or high temperature heating equipment. The invention ensures simple and economical bonding of large sized articles and configured articles as well as repair of broken articles.

EXAMPLE

Examples of the present invention are given below by way of illustration and not by way of limitation.

EXAMPLES 1-14

A primary formulation was prepared by tumbling the following ingredients in a ball mill.

α-SiC powder having a particle size of 20 μm (#800)     6.0 g

-continued

| | |
|---|---|
| (available from Shinano Denki Seiren K.K.) Graphite powder haveing a particle size of 1 - 3 μm, and a specific surface area of 150 m²/g | 3.5 g |
| Finaly divided silicon powder having a particle size of up to 1 μm | 15 g |
| Phenol resin (Resin Top ®, available from Gunyo Kagaku K.K.) | 1.0 g |
| Furan resin (Prominate ® Q, available from Takeda Pharmaceutical K.K.) | 2.5 g |
| Furfuryl alcohol | 2.0 g |

A secondary formulation was prepared by mixing the following ingredients.

| | |
|---|---|
| n-Butylamine [Curing agent for furan resin (Prominate ® Q 2001, available from Takeda Pharmaceutical K.K.)] | 0.1 g |
| Furfuryl alcohol | 5 g |

The primary formulation, 0.3 grams was mixed with the secondary formulation, 0.3 grams. The bonding composition was applied to a surface of one of two sample pieces. The sample pieces were semi-circular halves of a disk of reactively sintered SiC having a diameter of 30 mm and a thickness of 5 mm. The sample pieces were joined together through the bonding composition layer, under pressure.

The assembly was heated at 120° for 30 minutes to cure the composition. At this point, the assembly showed a bond strength of 2 kg/mm² at the bonding interface.

Thereafter, the assembly was further heated to 1,500° for 5 minutes in an argon atmosphere under atmospheric pressure, to complete bonding. At this point, the assembly showed a bond strength of 30 kg/mm² at the bonding interface.

Similar tests were carried out by the same procedure as above using various bonding compositions of the formulations shown in Table 1. The results are shown in Table 1. It should be understood that Examples 6 through 14 are outside the scope of the invention.

TABLE 1

| Sample No. | α-SiC Powder Amount (g) | α-SiC Powder Size (μm) | Carbon Powder Amount (g) | Carbon Powder Size (μm) | Silicon Powder Amount (g) | Silicon Powder Size (μm) | Phenol resin (g) | Furan resin (g) | Total Carbon Amount (g) | Bond strength (kg/mm²) | Remarks |
|---|---|---|---|---|---|---|---|---|---|---|---|
| 1 | 6.0 (1.0) | 20 | 3.5 | 1~3 | 15 (2.5) | <1 | 1 | 2.5 | 6.0 | 30 | |
| 2 | 3.5 (0.6) | 10 | 3 | ~1 | 14 (2.5) | 5 | 1 | 2.6 | 5.6 | 25 | |
| 3 | 3.5 (0.6) | 10 | 3 | ~1 | 20 (3.6) | 5 | 1 | 2.6 | 5.6 | 23 | |
| 4 | 5/5 (1.8) | 10/40 | 3 | ~1 | 15 (2.7) | 1 | 1 | 2.6 | 5.6 | 23 | |
| 5 | 5/5 (1.8) | 10/40 | 3 | 5 | 20 (3.6) | 5 | 1 | 2.6 | 5.6 | 29 | |
| 6* | 2 (0.36) | 10 | 3 | ~1 | 14 (2.5) | 5 | 1 | 2.6 | 5.6 | — | cracks upon calcining |
| 7* | 13 (2.3) | 10 | 3 | ~1 | 14 (2.5) | 5 | 1 | 2.6 | 5.6 | 10 | pores |
| 8* | 6 (1.0) | 100 | 3.5 | ~1 | 15 (2.5) | <1 | 1 | 2.6 | 6.1 | — | cracks upon calcining |
| 9* | 6 (1.1) | 0.1 | 3 | ~1 | 15 (2.7) | <1 | 1 | 2.6 | 5.6 | — | cracks upon calcining |
| 10* | 6 (1.1) | 20 | 3 | ~1 | 10 (1.8) | <1 | 1 | 2.6 | 5.6 | — | cracks upon calcining |
| 11* | 6 (1.1) | 20 | 3 | ~1 | 25 (4.5) | <1 | 1 | 2.6 | 5.6 | 7 | pores |
| 12* | 6 (1.1) | 20 | 3 | ~1 | 15 (2.7) | 50 | 1 | 2.6 | 5.6 | — | cracks upon calcining |
| 13* | 6 (1.1) | 20 | 3 | 20 | 15 (2.7) | 10 | 1 | 2.6 | 5.6 | — | cracks upon calcining |
| 14* | 6 (1.1) | 20 | 3 | ~1 | 15 (2.6) | <1 | 2.6 | 1 | 5.7 | — | cracks upon calcining |

The values in the parentheses are the ratios of α-SiC powder or silicon powder amount to the total carbon amount.
*outside the scope of the invention

EXAMPLE 15

The procedure of Example 1 was repeated by mixing the same primary and secondary formulations in the same amounts, applying the bonding composition to the same pieces of reactively sintered SiC, mating the pieces under pressure, and heating the assembly at 120° C. for 30 minutes to cure the compositions.

Thereafter, the assembly was heated to a temperature of higher than 1,500° C. in air using a propane burner, maintained at that temperature for 30 minutes, and then gradually cooled down. The assembly showed a bond strength of 20 kg/mm² at the bonding interface.

Although some preferred embodiments have been described, many modifications and variations may be made thereto in the light of the above teachings. It is therefore to be understood that within the scope of the appended claims, the invention may be practiced otherwise than as specifically described.

I claim:

1. A bonding composition for silicon carbide ceramics, comprising
    silicon carbide powder having an average particle size of 1 to 50 μm,
    carbon powder having an average particle size of up to 15 μm,
    silicon powder having an average particle size of up to 10 μm,
    a thermosetting resin selected from the group consisting of phenol resins, silicone varnishes, melamine resins, phenol-melamine resins and alkyd resins, a catalytically curable resin selected from the group consisting of furan resins, epoxy resins, unsaturated polyester resins and urea resins, and a curing agent for the catalytically curable resin, wherein said carbon powder is blended in an amount of 5 to 30% by weight based on the total weight of said silicon carbide powder, carbon powder and silicon powder, said catalytically curable resin is blended in an amount of 5 to 20% by weight based on the total weight of said silicon carbide powder, carbon powder and silicon powder, said thermosetting resin is blended in an amount of one-half to one-third of the weight of said catalytically curable resin, said curing agent is blended in an amount of 1 to 20% by weight of the amount of said catalytically curable resin, and 0.4 to 2.2 parts by weight of said silicon carbide powder and 1.9 to 4.2 parts by weight of said silicon powder are blended per part by weight of the total carbon in said carbon powder plus carbon present resulting from thermal decomposition of said thermosetting resin, said catalytically curable resin, and said curing agent, said total carbon being present in the resulting bonding layer in an amount of 10 to 50% by weight of said bonding layer.

2. The bonding composition of claim 1 wherein the silicon carbide powder has an average particle size of 3 to 35 $\mu$m.

3. The bonding composition of claim 1 wherein the carbon powder has an average particle size of up to 10 $\mu$m.

4. The bonding composition of claim 1 wherein the silicon powder has an average particle size of up to 7 $\mu$m.

5. The bonding composition of claim 1 which further comprises a sufficient amount of volatile solvent having a boiling point of 0° C. to 200° C. in a sufficient amount to form the composition to a paste.

6. The bonding composition of claim 1 wherein 0.6 to 2 parts by weight of the silicon carbide powder is present per part by weight of the total carbon.

7. The bonding composition of claim 1 wherein 2 to 4 parts by weight of the silicon powder is present per part by weight of the total carbon.

* * * * *